Dec. 23, 1958 E. LONG ET AL 2,865,828
MODERATOR AND REFLECTOR STRUCTURES FOR NUCLEAR REACTORS
Filed Dec. 12, 1955 4 Sheets-Sheet 1

Dec. 23, 1958  E. LONG ET AL  2,865,828
MODERATOR AND REFLECTOR STRUCTURES FOR NUCLEAR REACTORS
Filed Dec. 12, 1955  4 Sheets-Sheet 4

United States Patent Office 2,865,828
Patented Dec. 23, 1958

2,865,828

MODERATOR AND REFLECTOR STRUCTURES FOR NUCLEAR REACTORS

Everett Long, Warrington, and Frank Geoffrey Greenhalgh, Wigan, England, assignors to United Kingdom Atomic Energy Authority, London, England Application December 12, 1955, Serial No. 552,662

Claims priority, application Great Britain December 13, 1954

7 Claims. (Cl. 204—193.2)

This invention relates of moderator and reflector structures for nuclear reactors.

A moderator and reflector structure as used, for example, in a gas-cooled nuclear reactor comprises stacks of uniform right prismatic blocks positioned in layers extending in the direction of the length of the blocks, the blocks in the moderator part being suitably spaced to allow for growth under the effects of irradiation. Such a structure is not in itself stable and the instability is aggravated by the passage of a gas coolant through the structure which tends to blow it apart and by growth of the graphite under irradiation effects. Accordingly a restraint has to be provided to keep the structure stable whilst allowing for dimensional changes in the lifetime of the reactor. The design of restraint has to be based on the assumption that maintenance is not practicable.

The present invention provides a simple and reliable restraint for a moderator and reflector structure in a nuclear reactor.

The restraint according to the invention comprises, in combination with a moderator and reflector structure for a nuclear reactor, a series of elastic bands around the structure, each band comprising a series of joined links and each link comprising a nest of coaxial tubes, the tubes in each nest being end-loaded one against the other so that alternate tubes accept equal tensile and compressive loads respectively, couplings between adjacent links from the innermost tube at one link to the outermost tube of the adjacent link, and means for transmitting the tensions in the bands as a centripetal load to the walls of the moderator and reflector structure.

Where the radiation exposure is small, and the bands therefore have only to accommodate differential thermal expansions, such as at the top and bottom of a vertically orientated structure of prismatic or cylindrical form the tubes in any nest of tubes can be made alternately of different metals so as to be fully temperature compensated.

Where the bands have to accommodate growth due to irradiation effects, tubes of the same metal are preferably used throughout the bands as the irradiation growth eventually exceeds differential thermal expansions.

One form of restraint according to the invention will now be described with reference to the accompanying drawings wherein:

Fig. 2a is a view in the direction of the arrow IIa in Fig. 1a.

Fig. 3a is a sectional view in the direction of the arrow IIIa—IIIa of Fig. 1a.

Figure 1:
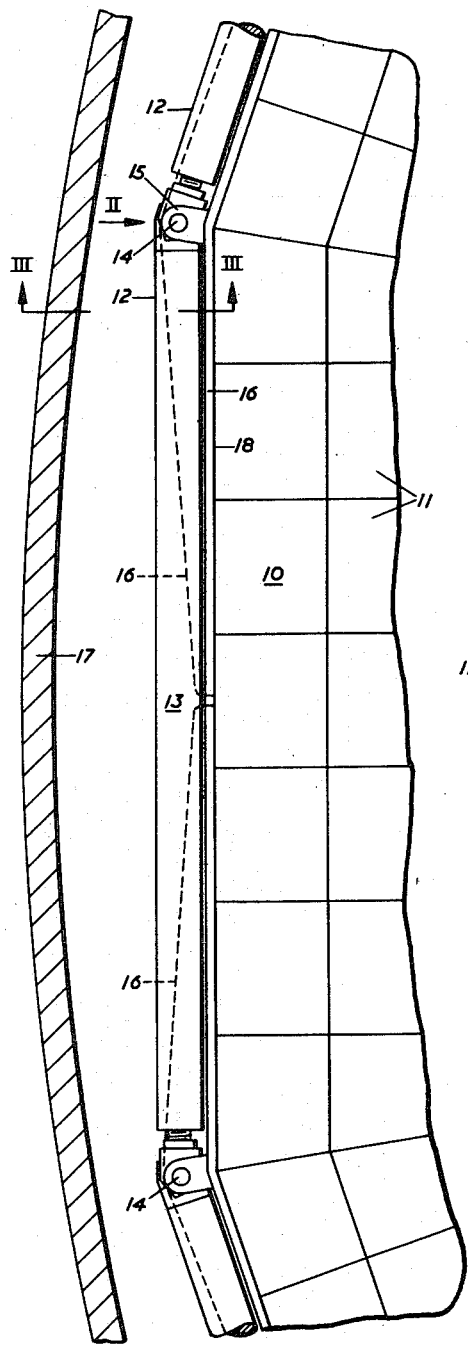
Fig. 1 is a plan view of one side of the top of a vertically orientated moderator and reflector structure with the restraint in position.
Figure 2:
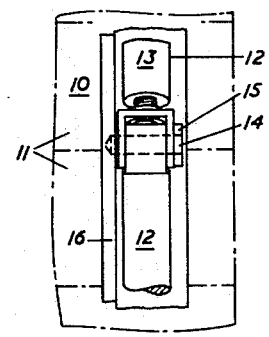
Fig. 2 is a view in the direction of the arrow II in Fig. 1.
Figure 3:
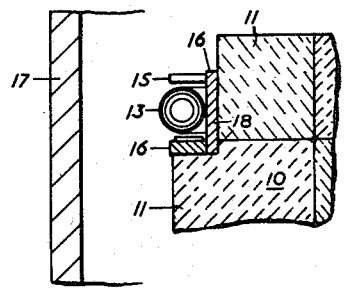
Fig. 3 is a sectional view in the direction of the arrow III—III of Fig. 1.

Referring to Figs. 1, 2 and 3, a pressure vessel 17 contains a graphite moderator and reflector structure 10 (the reflector portion only being shown) in the shape of a twenty-four sided prism constructed with right prismatic blocks 11 positioned in layers. Each layer is restrained from radial expansion by an elastic band 13. The band comprises twenty-four links 12 with pin joints 14 between the links. The joints 14 are held by a bracket 15 welded to angle section restraint beams 16 which press against the walls 18 of the structure 10 under the tension in the bands 13. Further details of construction of the links 12 and joints 14 are given below with reference to Figs. 4 and 5.

The bands 13 around each layer of graphite blocks 11 follow the pattern described with reference to Figs. 1, 2 and 3 with the exception of the bottom band 13 which is modified to provide a restaint to the structure 10 as a whole to prevent it rotating about its axis or moving sideways from its axis. Restraint in an axial direction is, of course, provided by reason of its vertical orientation and its base support.

Figure 1A:
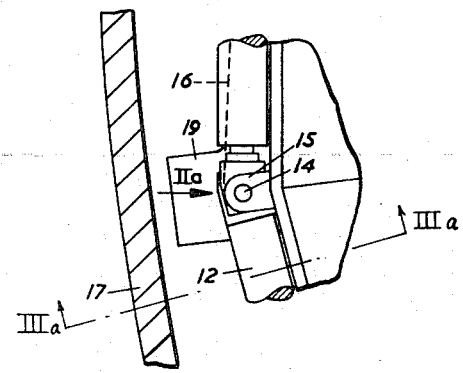
Fig. 1a is a plan view showing a modification to the joint in the restraint of Fig. 1 which is incorporated in the bottom restraint.
Figure 2A:
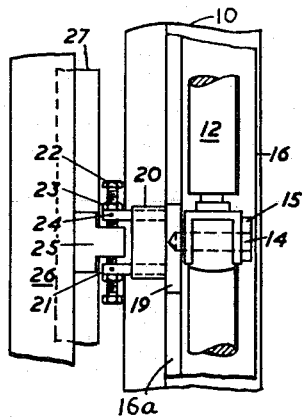
Figure 3A:
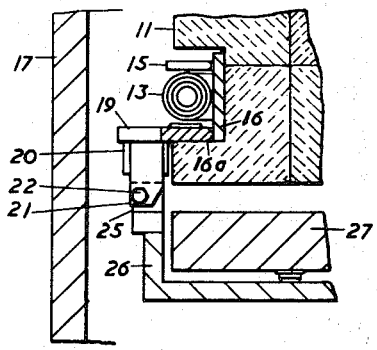

Referring to Figs. 1a, 2a, and 3a, the web 16a (Fig. 2a) of the angle-section restraint beam 16 has twenty-four extension parts 19, one at each joint 14. Parallel plates 20 carrying parallel legs 21 are welded to the parts 19. Each leg 21 is provided with a bolt 22, a lock nut 23 and a locking screw 24. The bolts are adjusted to have a .03" clearance with stops 25 which are welded to a grid 26 which is itself maintained coaxial with the pressure vessel 17 so that both radial and sideways movement of the structure 10 as a whole is prevented whilst radial growth is permitted. Components numbered 11, 12 and 13 on Figs. 1, 2 and 3 are similarly numbered on Figs. 1a, 2a and 3a. A four inch thick plate 27 on which the structure 10 rests is also shown in Figs. 2a and 3a.

Figure 4:
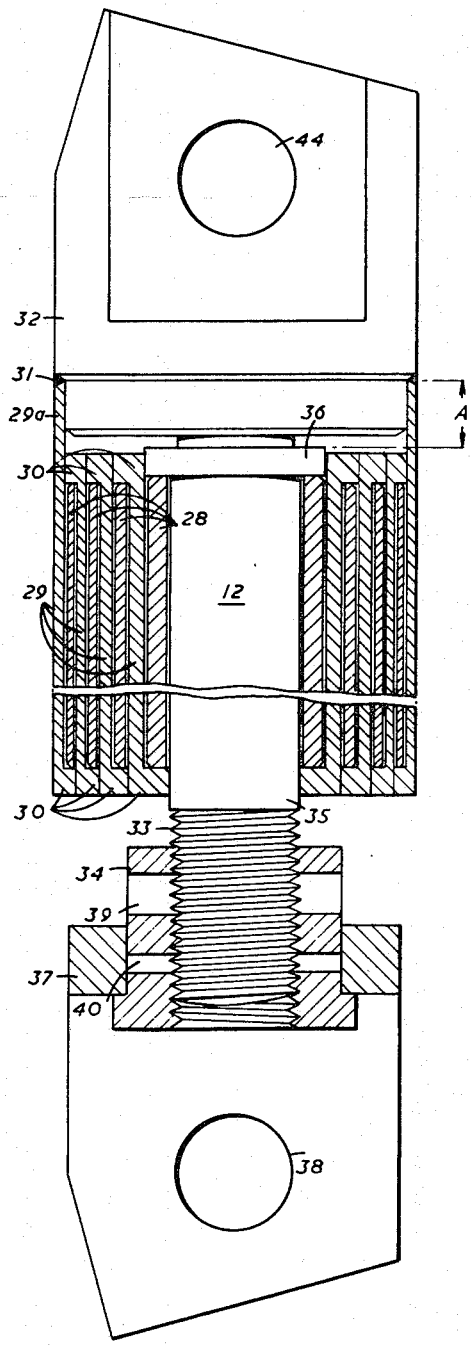
Fig. 4 is a part-section plan view of a link.
Figure 5:
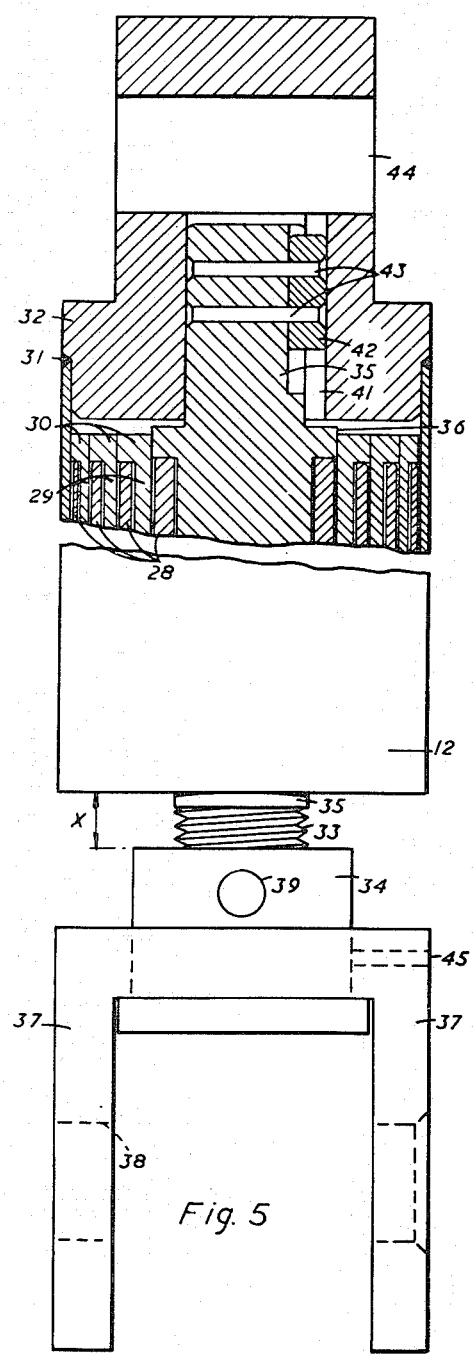
Fig. 5 is a part-section elevation of a link.

Referring now to Figs. 4 and 5, one link 12 is shown comprising a nest of tubes 28 and 29; the tubes 28 are in compression between the ends 30 of the tubes 29 which are in tension. A coupling is made by a weld 31 to an end piece 32 from the outermost tube 29. A coupling is made by a screwed end 33 of a tie bar 35 to a bush 34. A shoulder 36 on the bar 35 takes the thrust from the innermost tube 28. The bush 34 is located in a forked end 37 which is provided with a hole 38 to accommodate the pin of joint 14 (Fig. 1 etc.). The bush 34 has two holes 39 and 40. The hole 39 is to accommodate a turning bar and the hole 40 is for a dowel through the bush 34 and a hole 45 in the forked end 37.

The end piece 32 has a slot 41 in which a key 42 can slide. The key 42 is attached to the tie-bar 35 by rivets 43 to ensure that the bar 35 does not rotate when the bush 34 is rotated. A hole 44 is provided in the end piece 32 to take the pin of joint 14.

In the case of the top and bottom restraint bands, which have to provide for thermal expansion differences of about 0.2" per link, each link consists of two mild steel tubes 29 held in tension, two stainless steel tubes 28 held in compression and a tie bar 35 of mild steel held in tension.

For the intermediate restraint bands (as shown in Figs. 4 and 5) which have to accommodate irradiation growths estimated at about 1" per link, finally, there are three mild steel tubes 29 in tension, four mild steel tubes 28 in compression and a tie bar 35 of mild steel in tension.

In the assembly of the links 12, the ends 30 of the tubes 29 are welded to the tubes and the ends machined to the correct length. The tubes 29 are also cut to length and the assembly takes place from the innermost tube outwardly to the outermost tube. The overhang part 29a of the outermost tube will vary according to the aggregate of the tolerances on all the tubes and it is therefore important that this should be cut accurately to length relative to the shoulder 36 of the tie-bar 35 when the assembly is complete. That is, dimension A (Fig. 4) should be accurate so that the distance between centres of holes 38 and 44 (Fig. 4) is accurate and the designed take-up of the bush 34 on the screwed end 33 is not exceeded.

Figure 6:
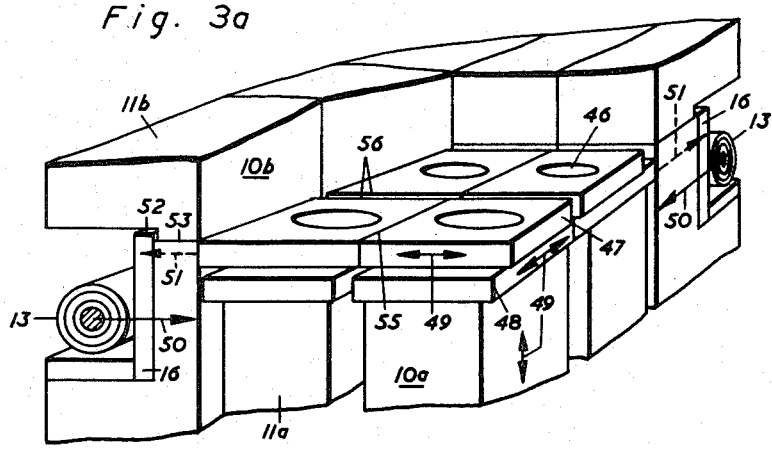
Fig. 6 is a diagram of a moderator and reflector structure.

The assembly of the links 12 into a band 13 around one layer of blocks 11 in the graphite structure will now be described but reference is first made to Fig. 6. This figure shows diagrammatically how the graphite moderator and reflector structure 10 is built up. In the moderator part 10a vertical graphite blocks 11a with central fuel element channels 46 are spaced apart to allow for growth by a double tile arrangement consisting of layers of tiles 47, 48.

The tiles 47 have their "north/south" faces 55 in contact and their "east/west" faces 56 spaced apart and the tiles 48 have the reverse arrangement. The arrows 49 indicate the axis out of the three co-ordinate axis for any tile or block along which the graphite has minimum growth under irradiation. The reflector part 10b of the moderator has blocks 11b which are not spaced apart as the radiation is not severe enough to cause any appreciable growth in them but they nevertheless have to move as the tiles grow in the direction of the arrows 49. Gas pressure in the spaces between the blocks 11a tends to blow the structure apart and this factor together with the requirement of general stability of the structure 10 requires the elastic bands 13 acting against restraint bars 16. The line of thrust of the bands 13 is shown by the arrows 50 whilst the reaction thrust from the tiles is shown by the arrows 51. Now it is arranged that in all layers of graphite except the top layer that the couple provided by arrows 50, 51 is in a sense to force the feet of the blocks 11b radially into the reactor, which coupled with the small overlap 52 between the restraint bar 16 and the foot of 53 of the block in the next highest layer allows easy assembly with a robust structure and minimum of bending movement in the blocks 11b. With the top layer (see Fig. 3) the line of thrust is just above the foot of the block 11.

In assembly the twenty-four restraint bars 16 of one band 13 are placed in position once their layer of graphite is laid and the links 12 are then loosely coupled with the bars 16 by having the bushes 34 screwed back and the joint pins 14 put in place. The bushes 34 are then screwed up to remove all the slack, given an extra quarter turn, released and retightened. The distances between bushes and link ends (dimension X on Fig. 5) are then measured at each joint. Each dimension X is then reduced by equal steps in a sequence which alternates between opposite sides of the structures 10. When all have been reduced by an amount to set up a predetermined tension (4½ tons) the bushes 34 are then moved so that dowel holes 45 and 40 come into line and a dowel is inserted from the top and peened over. The next layer of graphite is then laid.

Figure 7:
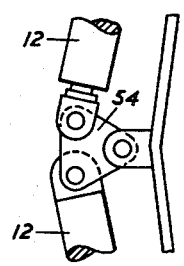
Fig. 7 is a plan view of a modified joint.

A modified design is shown diagrammatically in Fig. 7. In the arrangement a pivot plate 54 is provided and to which is connected the links 12. This arrangement has the advantage that equalisation of tensions in the links 12 is no problem but it suffers from the disadvantage that it requires more space.

The plate 54 could be replaced with a single link.

We claim:

1. In combination with a moderator and reflector structure for a nuclear reactor, restraint means comprising a series of elastic bands around the structure, each band comprising a series of joined links and each link comprising a nest of coaxial tubes, the tubes in each nest being end-loaded one against the other so that alternate tubes accept equal tensile and compressive loads respectively, couplings between adjacent links from the innermost tube of one link to the outermost tube of the adjacent link, and means for transmitting the tension in the bands as a centripetal load to the walls of the moderator and reflector structure.

2. In combination with a moderator and reflector structure for a nuclear reactor of prismatic form, restraint means comprising a series of elastic bands around the walls of the structure as referred to in claim 1 characterised in that the end bands have their tubes in compression made of differing material from the tubes in tension so that a degree of temperature compensation is achieved tending to produce constant tension in the bands with varying temperature.

3. In combination with a moderator and reflector structure for a nuclear reactor comprising stacks of uniform right prismatic graphite blocks positioned in layers extending in the direction of the lengths of the blocks, and the blocks in the moderator part being suitably spaced to allow for growth under the effects of irradiation, restraint means comprising for each layer of blocks an embracing elastic band comprising a series of joined links, each link comprising a nest of coaxial tubes of equal cross-sectional area and loaded one against the other in the nests so that alternate tubes are under equal tensile and compressive loads respectively, couplings between adjacent links from the innermost tube of one link to the outermost tube of the adjacent link, and means for transmitting the tension in the band as a centripetal load to the blocks in the layer.

4. In combination with a moderator and reflector structure for a nuclear reactor comprising stacks of uniform right prismatic graphite blocks positioned in layers extending in the direction of the lengths of the blocks and the blocks in the moderator part being spaced apart by members in compression at one end of the blocks abutting one another in planes across the layers, characterised in that said compression is set up by elastic bands as referred to in claim 3 causing a centripetal force to act in each layer and a torque on the outer members of each layer directing the non-abutting ends of the blocks inwards.

5. The combination of a moderator and reflector structure and restraint means as claimed in claim 1 vertically orientated, wherein the lowest of said bands has a group of restraint members restraining rotation of the band whilst permitting radial expansion and contraction of the band whereby the said structure is axially and circumferentially located whilst radial expansion is accommodated.

6. The combination of a moderator and reflector structure and restraint means as claimed in claim 1 wherein the coupling between said adjacent links comprises a plate member pin-jointed at the links and carried on a third pin-joint supported from said means transmitting a centripetal load.

7. The combination of a moderator and reflector structure and restraint means as claimed in claim 1 wherein said structure is of prismatic form and said means for transmitting centripetal load comprises members conforming with the corners and adjacent pairs of faces of the structure, and carrying pin joints at their apices which also serve as joints between the links in the elastic bands.

References Cited in the file of this patent

UNITED STATES PATENTS

| | | |
|---|---|---|
| 2,206,679 | Silbert | July 2, 1940 |
| 2,708,656 | Fermi et al. | May 17, 1955 |